United States Patent [19]

Carron

[11] Patent Number: 4,841,490

[45] Date of Patent: Jun. 20, 1989

[54] INVERSION OF A VERTICAL SEISMIC PROFILE BY MINIMIZATION OF AN ENTROPY LIKE FUNCTION

[75] Inventor: Didier Carron, Joinville, France

[73] Assignee: Schlumberger Technology Corporation, New York, N.Y.

[21] Appl. No.: 208,183

[22] Filed: Jun. 16, 1988

[30] Foreign Application Priority Data

Jun. 19, 1987 [FR] France .................. 87 8592

[51] Int. Cl.$^4$ ............................. G01V 1/28
[52] U.S. Cl. ......................... 367/38; 367/57; 364/421; 364/422
[58] Field of Search ............... 367/37, 38, 57, 191; 364/421, 422

[56] References Cited

FOREIGN PATENT DOCUMENTS 1569581 6/1988 United Kingdom .

OTHER PUBLICATIONS

Nali, "Recursive Derivation of Reflection Coefficients from Noisy Seismic Data," 1978 IEEE Int'l. Conf. on Acoustics, Speech & Signal Processing, Tulsa, Okla., 10–12 Apr. 1978, pp. 524–528.

Oldenburg, et al., "Inversion of Band-Limited Reflection Seismograms: Theory & Practice," Proc. of IEEE,. vol. 74, No. 3, Mar. 1986, pp. 487–497.

Primary Examiner—Thomas H. Tarcza
Assistant Examiner—Ian J. Lobo
Attorney, Agent, or Firm—Clifford L. Tager; Keith G. W. Smith

[57] ABSTRACT

The present invention is directed to a method of inverting seismic traces Sk by determining the series $R = \{r_i\}$ representative of the seismic reflection coefficients from geological strata. The method includes the steps of determining an approximate solution to $R°$ by minimizing an entropy type function $H(R) = \Sigma f(r_i)$ under constraints related to the upgoing wavefield Uk and the downgoing wavefield Dk; determining a correction value $\Delta R$ by minimizing a linear function $J(\Delta R)$ under linear constraints related to the noise in the traces and to the time-depth curve extracted from the traces; and calculating $R = R° + \Delta R$, representative of the reflection coefficients. In a variant, the selection of the approximate solution $R°$ is guided by taking into account information contained in one or more logs, and determining $\Delta R$ so that the series R satisfies the stacking velocities which result from surface seismic processing.

11 Claims, 7 Drawing Sheets

TIME (t)

INVERSION OF A VERTICAL SEISMIC PROFILE BY MINIMIZATION OF AN ENTROPY LIKE FUNCTION

The invention is directed to studying Vertical Seismic Profile, generally referred to by the abbreviation VSP, and more particularly to the inversion of such a profile.

In general, a seismic signal received by a detector is the response of variations in acoustic impedance of geological formations to an emitted seismic wave. The acoustic impedance of a formation is defined as being the product of the density of the medium multiplied by the velocity of propagation of the seismic wave through the medium.

The acquisition of a VSP comprises recording seismic signals picked up at different levels in a borehole in response to seismic excitations emitted at the solid surface of the earth. The inverse configuration can also be used, i.e. detectors may be situated on the solid surface of the earth and used in combination with seismic excitations performed at different levels in a borehole. Studying a VSP includes, in particular, solving the problem of inverting the seismic signals in such a manner as to extract the acoustic impedance of a formation, and thus reconstruct the acoustic impedance profile as a function of a time scale and/or a depth scale.

The acoustic impedance profile corresponds mathematically to a sequence of transmission media for which the rank numbers n, the geometrical positions, and the acoustic impedance values $\{A_i, i=1,n\}$, all need defining. An equivalent way of defining the acoustic impedance profile comprises a sequence of reflection coefficients $\{r_i, i=1,n\}$ placed at the interfaces between the transmission media and having values given by the formula:

$$r_i = (A_{i+1} - A_i)/(A_{i+1} + A_i)$$

A major difficulty encountered during inversion lies in the fact that the number of unknowns (for example, the positions and the values of the reflection coefficients) is very high (typically about 1000), since each depth-representing sample is a potential candidate for being the position of a reflection coefficient, whereas the number of available equations depends on the width of the frequency spectrum of the seismic traces and, in general, is much less than the number of unknowns.

Of the various known inversion techniques, particular mention should be made of the technique described by A. Bamberger et al, in an article entitled "Inversion of Normal Incidence Seismograms" published in Geophysics (vol. 47, May 1982, pages 757–770) herein incorporated by reference. This technique is considered by those skilled in the art as one of the most satisfactory from the purely mathematical point of view. However, its implementation suffers from the drawback of being extremely expensive in terms of required computation time.

Another known technique includes, in the first step, a limited number of possible positions for the interfaces being selected, and then, in the second step, the value of the reflection coefficient at each of the determined positions is calculated in such a manner as to minimize the difference between the recorded trace and the synthetic trace obtained from the profile found in this way. The article entitled "Inversion of Vertical Seismic Profiles by Iterative Modelling" by P. Grivelet published in Geophysics (vol. 50, June 1985, pp. 924–930), herein incorporated by reference, provides a good summary of the various steps of this method. The article also emphasizes the desirability of reducing the number of possible solutions by imposing conditions which result from a priori knowledge of the acoustic impedance values of one or more given geological strata.

It should be noted that the Grivelet method is presently capable of inverting only one trace at a time. This limitation may be a considerable drawback when the signal being inverted is degraded by noise. It is well known that noise can introduce imaginary interfaces relating to non-existent geological strata.

Further, the second step does not allow new interface positions to be re-defined if there is disagreement with the seismic equations, and is therefore prisoner to any errors that may have arisen during the first step.

Finally, the only additional a priori information this type of inversion is capable of accepting is information concerning the acoustic impedance of some of the geological strata.

To sum up, prior techniques are incapable of optimizing the inversion procedure by injecting the information contained in all of the recorded seismic signals, together with other information known beforehand, but different in nature from the solution being sought.

The present invention is directed to providing an inversion method which makes it possible to simultaneously take into account the available information concerning reflection coefficients. A first source of available information comprises acoustic information per se, in particular, measurements of the propagation times of waves between the various acquisition levels of the VSP, estimates of the noise affecting the recorded traces, and optionally knowledge of stacking velocities provided by surface seismic processing. A second important source of information comes from logging measurements, for example, measurements of resistivity, porosity, density, etc. . . ., which have the advantage over seismic data of being sampled at a smaller sampling interval. The study of such borehole logs makes it possible to define the probable positions of the major interfaces with very good accuracy in the longitudinal direction of the borehole.

The invention is also directed to minimizing the computation time required to invert a VSP, and in particular, to keep the computation time required beneath a commercially acceptable threshold.

According to a first aspect, the present invention provides a method of identifying underground geological strata from a plurality of seismic traces $Sk(t)$ recorded in a borehole at different levels k of depth Zk, with each trace $Sk(t)$ includes n discrete sample values sampled as a function of time t at a constant time interval $\Delta t$, the method determining the series $R = \{r_i, \text{ for } i=1,n\}$ representative of seismic reflection coefficients at the interfaces formed between successive geological strata, with i being an index relating to the sampling depth on a time scale at the constant interval $\Delta t$, the method including the steps of:

establishing the time-depth curve relating the depth Zk to the transit time Tk recorded on the trace $Sk(t)$ for each level k;

extracting the upgoing wavefield $Uk(t)$ and the downgoing wavefield $Dk(t)$ from the traces $Sk(t)$; and calculating $U^{mean}(t)$, $U^{min}(t)$, and $U^{max}(t)$ representative of mean value, minimum value, and maximum value, respectively, of the upgoing wavefield $U_k(t-T_k)$, and calculating $D^{mean}(t)$ representative of mean value of the downgoing wavefield $D_k(t+T_k)$.

The method also includes the steps of:

(a) determining a series $R^o = \{r^o_i\}$ representative of an approximation to the series R by minimizing the function $$H(R) = \Sigma f(r_i)$$

where $f(r_i)$ is an increasing function of $|r_i|$, which is symmetrical on the X axis, which is concave, and which satisfies the constraint $R * D^{mean}(t) = U^{mean}(t)$ in which the operator * represents a convolution product;

(b) determining a series $\Delta R = \{\delta r_i\}$ representative of a value for correcting the series $R^o$ and minimizing a function $J(\Delta R)$ which is linear in $|\delta r_i|$ under the constraints:

$$U^{min}(t) < [(R^o + \Delta R) * D^{mean}(t)] < U^{max}(t) \text{ and}$$

$$|Z_k - Z_{ks}(R^o + \Delta R)| < \epsilon_k$$

in which $Z_{ks}(R^o + \Delta R)$ is a linearized function in $\Delta R$ representative of the depth $Z_{ks}$ calculated by synthesis at level k from the initial solution $R^o$ and the magnitude $\epsilon_k$ is representative of the uncertainty in the magnitudes of $Z_k$ and $T_k$; and (c) calculating the series $R = R^o + \Delta R \{r_i = r^o_i + \delta r_i\}$ representative of seismic reflection coefficients.

Preferably, the values $U^{mean}(t)$ and $D^{mean}(t)$ are transformed into the frequency domain thereby obtaining the values $U^{mean}(\omega)$ and $D^{mean}(\omega)$, and the constraints of the first step are expressed in the frequency domain, i.e.: $F.R. = U^{mean}(\omega)/D^{mean}(\omega)$ where F is the matrix associated with the Fourier transform restricted to the useful frequency band of the seismic traces.

Preferably, the function $J(\Delta R)$ is of the form:

$$J(\Delta R) = \Sigma a_i |\delta r_i|$$

where $a_i$ is a weighting coefficient dependent on $r^o_i$.

A variant of the method in accordance with the present invention further includes the steps of:

using the time-depth curve $\{Z_k, T_k\}$ to transpose at least one logging curve Y(d) previously recorded as a function of depth d in said borehole over a depth interval which covers, in particular, the depth levels $Z_k$, into a discrete log $Y(t) = \{y_i(t)\}$ sample on a time scale at the same time interval $\Delta t$;

calculating the discrete differential of $Y(t)$, i.e. $Y'(t) = \{y'_i(t) = y_{i+1}(t) - y_i(t)\}$, together with its transform into the frequency domain, i.e. $Y'(\omega)$; and determining two series $R^o = \{r^o_i\}$ and $\hat{Y}' = \{\hat{y}'_i\}$ representative of an initial approximate solution and of the discrete differential of the zoned log $\hat{Y}(t)$, respectively for which the zero values of $r^o_i$ and $\hat{y}'_i$ have the same index i, by simultaneously minimizing the functions $$H(R) = \Sigma f(r_i)$$

$$H(\hat{Y}') = e(\hat{y}'_i)$$

in which $e(\hat{y}'_i)$ is an increasing function of $|\hat{y}'_i|$, which is symmetrical on the X axis and which is concave, under the constraints $$F.R = U^{mean}(\omega)/D^{mean}(\omega)$$

$$E.\hat{Y}' = \hat{Y}'(\omega)$$

in which E is the matrix associated with the Fourier transform restricted to an identical number of frequencies as that of said useful band.

Another variant of the method according to the present invention minimizing the function $J(\Delta R)$ under the additional constraint:

$$|W_a - W_{as}(R^o + \Delta R)| < \epsilon v$$

in which $W_a$ represent the stacking velocities corresponding to times $\tau_a$ obtained by surface seismic processing, and $W_{as}(R^o + \Delta R)$ is a linearized function in $\Delta R$, representative of the synthetic stacking velocities $W_{as}$ available from the initial solution $R^o$, and the magnitude $\epsilon v$ is representative of the uncertainty on the stacking velocities $W_a$.

According to a second aspect of the present invention, a method of comprising performing a zoning operation on a discrete log $Y(t) = \{y_i(t), i=1,n\}$ sampled at a constant time interval $\Delta t$, thereby obtaining the series $\hat{Y} = \{\hat{y}'_i, i=1,n\}$ indicative of the positions of the interfaces formed between successive geological strata, comprises the steps of:

calculating the discrete differential $Y' = \{y'_i\}$ of Y and calculating its transform into the frequency domain $Y'(\omega)$;

determining the series $\hat{Y}'$, indicative of the positions of the interfaces, by minimizing the function:

$$H(\hat{Y}') = \Sigma e(\hat{y}'_i)$$

in which $e(y'_i)$ is an increasing function of $|\hat{y}'_i|$, which is symmetrical on the X axis and which is concave, under the constraint $$E.\hat{Y}' = Y'(\omega)$$

in which E is the matrix associated with the Fourier transform restricted to a selected number of frequencies.

Preferably, the functions e and f are as follows:

$$f(r_i) = (1 - e^{-|r_i|})$$

$$e(\hat{y}'_i) = (1 - e^{-|\hat{y}'|})$$

Figure 1:
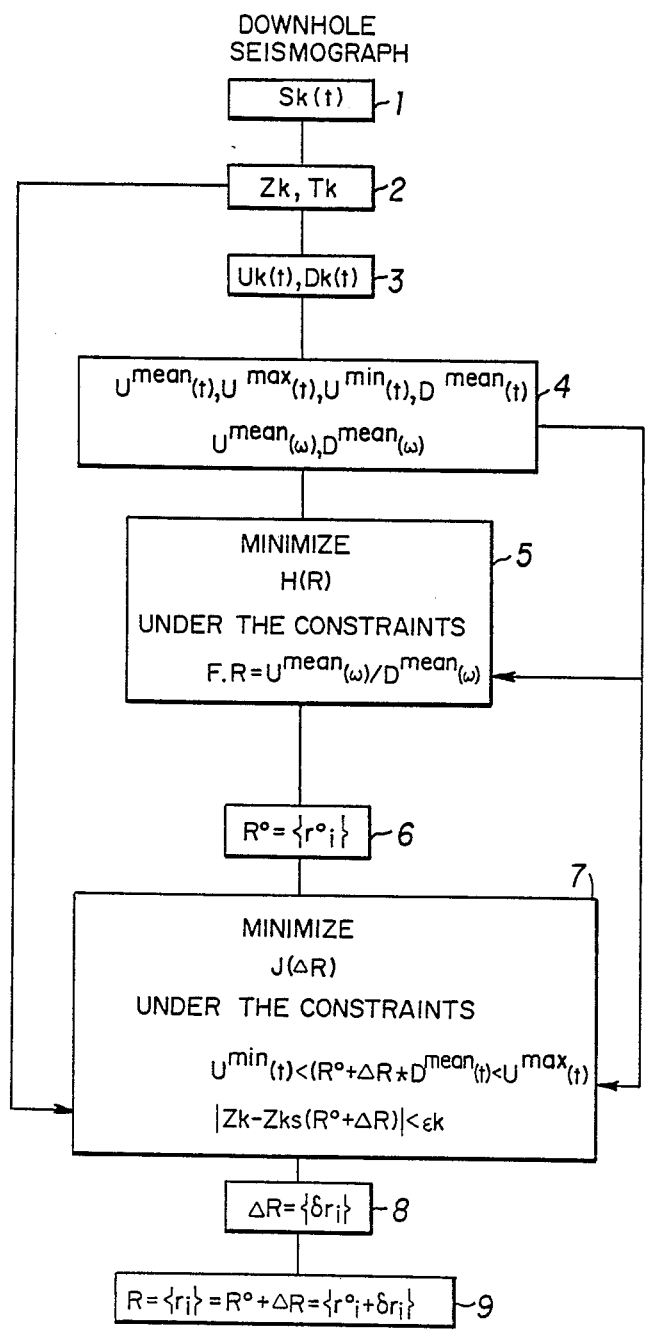
FIG. 1 is a general flowchart of the method in accordance with the present invention which comprises identifying the successive geological strata through which a borehole passes primarily from information contained in the downhole seismic traces $S_k(t)$.

In order to solve the complex problem posed by inversion simply and rapidly, the following assumptions are usually made:

firstly, only acoustical phenomena are actually taken into account;

secondly, all of the geological strata are assumed to be in the form of horizontal planes, thereby reducing the problem to only one dimension; and finally, some gain recovery is applied to compensate for the effects of spherical divergence.

These assumptions give rise to the following equation:

$$Uk = R*Dk + Bk \quad (I)$$

where:
Uk is the upgoing wave recorded at level k;
Dk is the downgoing wave recorded at level k;
R represents the series of reflection coefficients expressed on a time scale;
Bk represents noise mathmematically defined as that which does not correspond to a primary reflected wave, i.e. a wave which does not contain multiple reflections; and
the symbol * is the convolution operator.

It is thus necessary to solve for the unknown R using the upgoing wave Uk and the downgoing wave Dk.

In the frequency domain, equation (I) becomes:

$$Uk(\omega) = R(\omega).Dk(\omega) + Nk(\omega) \quad (II)$$

where:
the term $Nk(\omega)$ is noise mathematically defined as that which does not correspond to a primary reflection as defined by the one-dimensional wave equation.

The set of solutions for equation (II) is infinite. Consequently, it is desirable to limit the domain of possible solutions by means of constraints which result from knowledge of information coming from various origins and which are not necessarily of the same nature as the solution being sought. From entropy theory, also known as information theory, a particular and preferable solution in the domain of possible solutions is the solution which presents a minimum entropy. However, given that the variables being manipulated are not statistical, a broadened notion of the concept of entropy is considered which retains the essential properties of entropy, and in particular its increase as a function of dispersion in the variables.

Work performed by the inventor of the present invention has led to functions of the entropy type being defined in a general manner, which functions are of increasing absolute value, are symmetrical on the X axis and are concave in a broad sense. Functions which are concave in a broad sense include, in particular, functions which are linear in absolute value, such as the function below, proposed in the article entitled "Reconstruction of a Sparse Spike Train From a Portion of its Spectrum, and Application to High Resolution Deconvolution" by S. Levy and P.K. Fullagar published in Geophysics (vol. 46, pages 1235-1243):

$$H(X) = \sum_{i=1}^{n} |x_i|$$

Of those entropy type functions which have increasing absolute value, which are symmetrical on the X axis, and which are concave in the broad sense, the following strictly concave function is preferred:

$$H(R) = \sum_{i=1}^{n} (1 - e^{-|r_i|}) - \Sigma f(r_i)$$

which also has the advantage of being zero at the origin.

INVERSION METHOD (FIG. 1)

Figure 5:
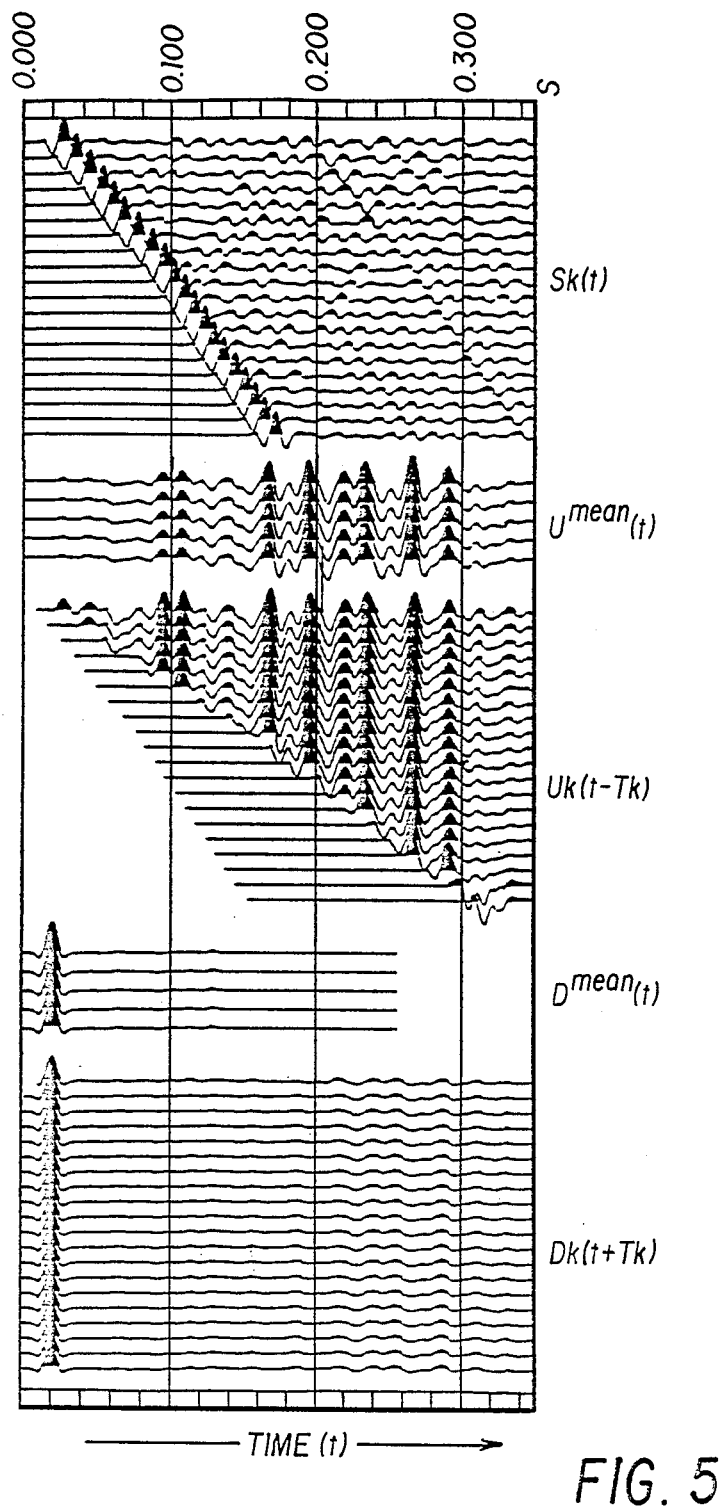
FIG. 5 illustrates an example of traces $S_k(t)$, deconvoluted upgoing wavefields $U_k(t-T_k)$ and downgoing wavefields $D_k(t+T_k)$, and mean upgoing and downgoing traces $U^{mean}(t)$ and $D^{mean}(t)$.

FIG. 1 is a diagrammatic general flowchart of the method in accordance with the present invention. The seismic traces Sk(t) shown in FIG. 5 are recorded in a borehole at different levels k at depths Zk and are sampled at a constant sampling interval $\Delta t$. The traces Sk(t) are used (1), in known manner, to establish (2) the time-depth curve in the form of a series of pairs of values {Zk, Tk} in which Tk represents the transit time or the time of arrival of the first wave recorded on the corresponding trace Sk(t).

The traces Sk(t) are then subjected to preliminary processing (3) which includes extracting the fields of upgoing waves Uk(t) and downgoing waves Dk(t) from the field of traces Sk(t) preferably by means of a velocity filter, for example, the velocity filter described in European Pat. No. EP-0 053 525 by Seeman and Horowicz. It is desirable to apply a conventional deconvolution operator to the fields in order to obtain upgoing wavefields Uk(t) and downgoing wavefields Dk(t) which contain primary waves only.

FIG. 5 also shows the upgoing wavefields Uk(t−Tk) and the downgoing wavefields Dk(t+Tk) respectively shifted to right and to left by the value Tk so as to align respective up and down events.

A window is selected from the upgoing wavefield Uk(t−Tk) and from the downgoing wavefield Dk(T+Tk) obtained in this way corresponding, for example, to an interval of 100 ms, in order to determine the following values (4) by any conventional manner:

$U^{mean}(t)$ representative of a mean value of the upgoing wave in the time domain, and illustrated in FIG. 5;

$U^{mean}(\omega)$ representative of a mean value of the upgoing wave in the frequency domain;

$D^{mean}(t)$ representative of a mean value of the downgoing wave in the time domain and illustrated in FIG. 5;

$D^{mean}(\omega)$ representative of a mean value of the downgoing wave in the frequency domain;

$U^{max}(t)$ representative of a maximum value of the upgoing wave in the time domain; and $U^{min}(t)$ representative of a minimum value of the upgoing wave in the time domain.

It is noted that the quantities "mean value", "minimum value", and "maximum value" may alternatively be determined arithmetically or be deduced from statistical analysis. For example, quantities deduced from the mean value and the calculated standard deviation may be taken for the extreme values.

The numerical values used in the following example are given purely by way of illustration, and consequently they are not to be interpreted as limiting the scope of the invention. In the example described, the sampling rate $\Delta t$ of the traces $Sk(t)$ is 1 ms over a time of 256 ms.

In a first step (5) during which noise N is not taken into account, i.e. during which noise is assumed to be zero, an initial estimate $R^o = \{r^o{}_i\}$ of the solution within the solution domain is determined (6) by minimizing a function of the entropy type having increasing absolute value, which is symmetrical on the X axis, and which is concave in the broad sense, and preferably the following function $H(r)$:

$$H(R) = \sum_{i=1}^{n} (1 - e^{-|r_i|}) - \Sigma f(r_i)$$

where $n = 256$ in the example under consideration, while satisfying the linear constraints that result from equation (II):

$$U^{mean}(t) = R \ast D^{mean}(t)$$

or in the frequency domain:

$$F.R = U^{mean}(\omega)/D^{mean}(\omega)$$

where:

F is a 256×256 matrix associated with the Cooley-Tuckey fast Fourier transform "FFT" and preferably restricted to the useful frequency band;

R is a 1×256 matrix comprising the series $\{r_i\}$, where i is an index varying from 1 to 256 and relating to the sampling depth in terms of a time scale having a regular interval $\Delta t$; and $U^{mean}(\omega)/D^{mean}(\omega)$ is a 1×256 matrix comprising 256 samples $u_i{}^{mean}/d_i{}^{mean}$. The constraints thus represent a set of 256 linear equations for each corresponding integer frequency f or angular frequency $\omega$.

This constraint is meaningful only over the frequency band [fmin, fmax] which is effectively usable, the usable band being related to the nature quality of the seismic source itself. Generally, it is considered that seismic sources in current use correspond to a useful frequency band lying between 10 Hz and 80 Hz. In the example used in this description, a useful frequency band lying between 10 Hz and 50 Hz is used for illustrative purposes, with $D(\omega) \simeq 0$, i.e. noise, being assumed for frequencies of less than 10 Hz and more than 50 Hz.

Consequently, only m constrained equations need to be considered, which means that only m coefficients can be uniquely calculated, where m is defined by the formula:

$$m = \frac{n(fmax - fmin + 1)}{fnyq} = \frac{256(50 - 10 + 1)}{500} = 21 < n$$

where:

n is the number of samples in each of the seismic traces, i.e. 256 in the present example;

fmax and fmin define the useful frequency band, i.e. 10 Hz to 50 Hz in the example described; and fnyq represents the Nyquist frequency derived from the rate at which the seismic signals are sampled, i.e. 500 Hz in the example described;

giving m = 21 possible interfaces over an analyzed interval of 256 ms, or else in another form giving a maximum of 21 non-zero reflection coefficients $r_i$.

The process (5) of minimizing the function H(R) can be performed by any primal method operating in the feasible domain as is shown in the book entitled "Linear and Non-Linear Programming" by D. G. Luenberger, published 1984 by Addison-Wesley Publishing Company, herein incorporated by reference. A primal method is described below in detail with reference to FIG. 2 which shows a minimization method using a modified reduced gradient algorithm, although it should be understood that the method could also be performed in similar manner using a modified projected gradient algorithm.

The result of the minimization gives rise to an initial approximate solution (6) $R^o = \{r^o{}_i\}$ where $i = 1$ to 256, giving 21 non-zero reflection coefficients with the other 235 coefficients being zero.

We now turn to the second step of the method in accordance with the invention in which the initial solution $R^o$ is refined using the following equation:

$$R = R^o + \Delta R \text{ or } r_i = r^o{}_i + \delta r_i \text{ for } i = 1,256$$

The increment $\Delta R = \{\delta r_i\}$ is calculated by taking account of the noise Bk and by taking account of the information relating to the time-depth curve $\{Zk, Tk\}$. To this end, the following weighed linear function $J(\Delta R)$ is minimized (7):

$$J(\Delta R) = \sum_{i=1}^{n} a_i |\delta r_i| \text{ where } \Delta R = \{\delta r_i\}$$

in which $a_i$ is a weighting factor which penalizes samples for which $r^o{}_i$ is zero by giving them larger weights than those which are given to samples for which $r^o{}_i$ is non-zero. More particularly, it is preferable for $a_i$ to be a positive real number corresponding to the largest one of the following two values $1/r^{omin}$, $1/r^o{}_i$.

$$a_i = \max\{1/r^{omin}, 1/r^o{}_i\}$$

where $r^{omin}$ = minimum value of the non-zero coefficients $r^o{}_i$.

This minimization is subjected to constraints which are defined firstly by noise and secondly by the time-depth curve.

Firstly, the constraints related to noise come from the maximum and minimum values $U^{max}(t)$ and $U^{min}(t)$ determined above (4) which define a range within which the final solution for R must be found. In other words, these constraints may be put in the form of the following inequality which is linear in $\Delta R$:

$$U^{min}(t) < [(R^o + \Delta R) \ast D^{mean}(t)] < U^{max}(t)$$

Further, the constraints related to the time-depth curve stem from the series of values $\{Tk, Zk\}$ determined above (2). It is possible to assume that the difference between the real depth Zk and the synthetic depth Zks as calculated in independent manner from the propagation velocities, must be less than a magnitude $\epsilon k$ which is deduced from the uncertainty on the measurement errors in Zk and Tk. This constraint may be expressed mathematically in the form of the following inequality:

$$|Zk-Zks(R^o+\Delta R)|<\epsilon k$$

When developed, this inequality becomes:

$$\left| Zk - \Delta t \sum_{i=1}^{Nk} V_i \right| < \epsilon k$$

in which $\Delta t$ is the time sampling rate, i.e. 1 ms in the present example;

$Nk$ represents the time of the first arrival at depth $Zk$ expressed as a number of samples; and $V_i$ is the velocity of the seismic wave in the 1 ms interval $[i,i+1]$.

If the density of the rock formations is assumed to be constant, it is possible to write:

$$\left| Zk - V_1 \cdot \Delta t \sum_{i=1}^{Nk} \prod_{j=1}^{i-1} \frac{1+r_j}{1-r_j} \right| < \epsilon k$$

where $V_1$ is the velocity of the top stratum as determined from the trace recorded at the shallowest level.

By differentiating the above equation about the initial solution $R^o$ and neglecting second order terms, the constraint relating to the time-depth curve can be expressed by the following linear inequality in $\delta r_i$:

$$\left| Zk - 2 \cdot \Delta t \sum_{i=1}^{Nk-1} \delta r_i \left( \sum_{j=i+1}^{Nk} V^o_j \right) \right| =$$

$$|Zk - Zks(R^o + \Delta R^o)| < \epsilon k$$

where $V^o_j$ is the propagation velocity calculated from the coefficients $r_1$ obtained during the first step using the formula:

$$V^o_j = V_1 \prod_{l=1}^{j-1} \frac{1+r^o_l}{1-r^o_l}$$

To sum up, the second step thus consists in minimizing the function:

$$J(\Delta R) = \sum_{i=1}^{n} a_i |\delta r_i| \text{ where } \Delta R = \{\delta r_i\}$$

under the following constraints which are linear in $\Delta R$:

$$U^{min}(t) < [(R^o + \Delta R) * D^{mean}(t)] < U^{max}(t) \text{ and}$$

$$|Zk - Zks(R^o + \Delta R)| < \epsilon k$$

However, since the norm $J(\Delta R)$ is expressed as a function of absolute values and therefore does not constitute a differentiable function of $r_i$, the increment $\delta r_i$ must be decomposed into two positive values $\delta r_i^+$ and $\delta r_i^-$, and this must be done regardless of the value of the index i, such that:

$$\delta r_i = \delta r_i^+ - \delta r_i^- \text{ where } \delta r_i^+ > 0 \text{ and } \delta r_i^- > 0 \text{ for } i=1,n$$

It is easy to show that the minimum of $J(\Delta R)$ is reached when at least one of the values, i.e. $\delta r_i^+$ or $\delta r_i^-$ is equal to zero for each value of the index i. Consequently, the following may be written:

$$|\delta r_i| = |\delta r_i^+ - \delta r_i^-| = \delta r_i^+ + \delta r_i^-$$

The problem is finally reduced to finding two series $\Delta R^+ = \{\delta r_i^+\}$ and $\Delta R^- = \{\delta r_i^-\}$ which minimize the function $$J(\Delta R) = \sum_{i=1}^{n} a_i (\delta r_i^+ + \delta r_i^-)$$

while satisfying the constraint equations $$U^{min}(t) < [(R^o + \Delta R^+ - \Delta R^-) * D^{mean}(t)] < U^{max}(t)$$
and
$$|Zk - Zks(R^o + \Delta R^+ - \Delta R^-)| < \epsilon k$$

The process of minimizing the function $J(\Delta R)$ may be performed by a commercially available computer program which codifies one of the numerous appropriate linear programming algorithms, e.g. IMSL (International Mathematical and Scientific Libraries) software which codifies the well-known simplex algorithm. The final solution R is obtained (9) by adding together the initial solution $R^o = \{r^o_i\}$ obtained during the first step (6), and the increment $\Delta R = \{\delta r_i\}$ obtained (8) during the second step, i.e.

$$R = \{r_i\} = \{r^o_i + \delta r_i\} = \{r^o_i + \delta r_i^+ - \delta r_i^-\}$$

Figure 6A:
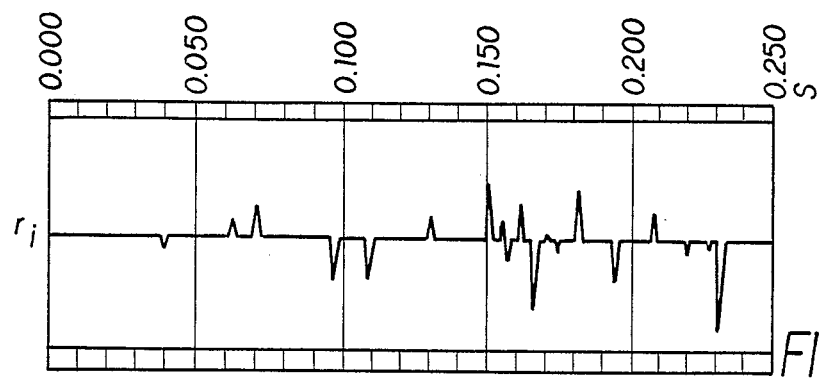
FIG. 6A illustrates the series of reflection coefficients $r_i$ obtained using the method described with reference to FIG. 1.

FIG. 6A shows the series of coefficients $r_i$ plotted along a time scale and as obtained from the traces $Sk(t)$ shown in FIG. 5.

MINIMIZING THE FUNCTION H(R) (FIG. 2)

Figure 2:
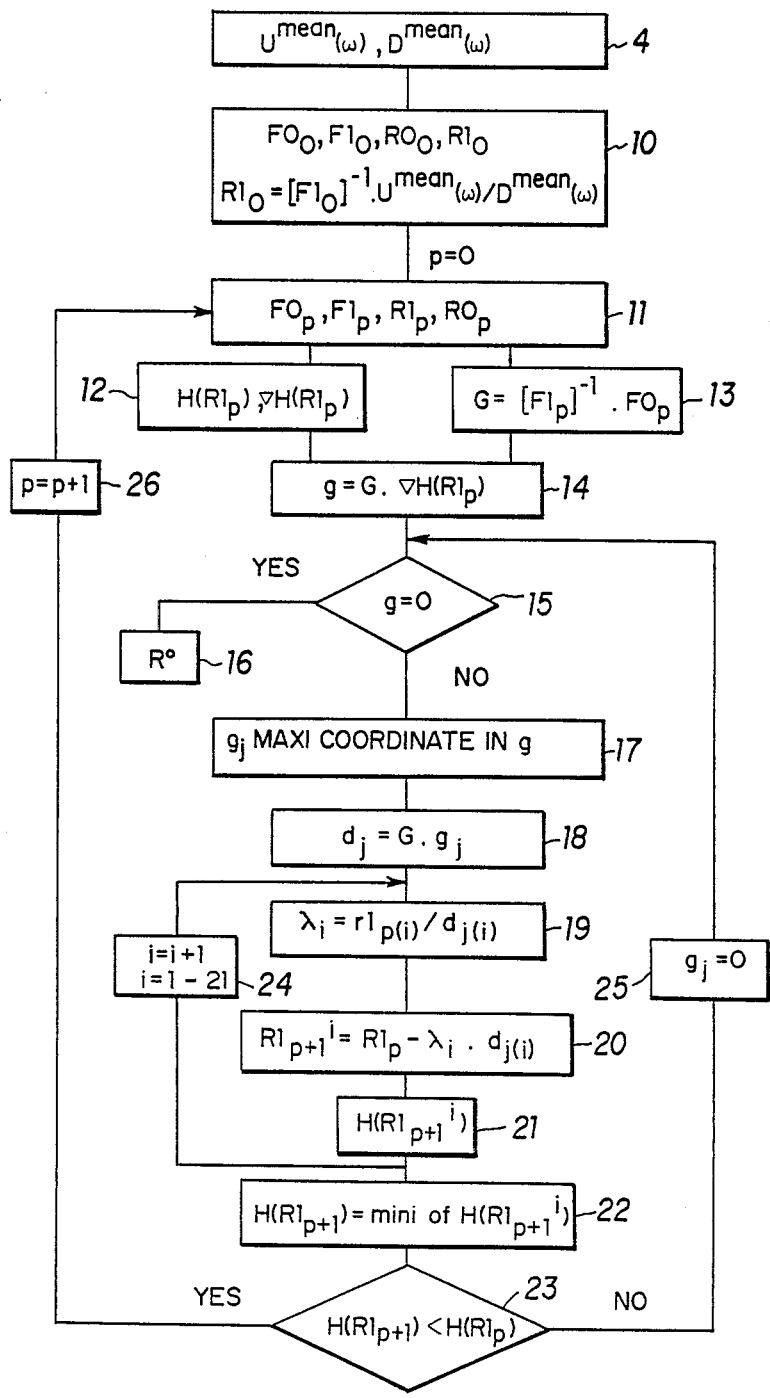
FIG. 2 is a detailed flowchart showing a particular method of minimizing the first step described with reference to FIG. 1.

A detailed description of minimizing the function $h(r)$ is now given with reference to FIG. 2, including a practical example for showing its implementation. The matrix constraint equation $f.r = u^{mean}(\omega)/d^{mean}(\omega)$ may be represented in $r^{256}$ as a polyhedron with each of its vertices being defined by 256 coordinates, of which $m=21$ are non-zero and are referred to as base variables, while the remaining 235 coordinates are zero and are referred to as out-of-base variables. A conventional linear programming theorem applicable to a concave function such as H(R) shows that the function H(R) has an absolute minimum which is situated on one of the vertices of the polyhedron, i.e. the coordinates of the series $R^o$ being looked for correspond to one of the vertices of the solution polyhedron for which $m=21$ co-ordinates are non-zero and $(n-m)=235$ coordinates are zero.

Thus, minimizing the function H(R) includes successively considering the series R constituting the vertices of the polyhedron of solutions in order to obtain the solution $R^o$ for which the function $H(R^o)$ reaches its absolute minimum. Thus, by using the reduced gradient method, described at pages 345–358 of the above-mentioned book by D. G. Luenberger, it is possible to segment the set R into two sub-sets R0 and R1, containing 235 zero coefficients $r_i$ and 21 non-zero coefficients $r_i$, respectively. The problem of minimizing the function H(R) can thus be re-written in the following form:

minimize $H(R) = H(R0, R1) = H(R0) + H(R1)$ under the constraint $F.R = (F1.R1, F0.R0) = U^{mean}(\omega)/D^{mean}(\omega)$ in which the sub-matrices F0 and F1 correspond to the sub-sets R0 and R1, respectively, at the frequencies under consideration.

The index 0 is segmented (10) by determining the 21 interface positions using the upgoing waves $U^{mean}(\omega)$ and the downgoing waves $D^{mean}(\omega)$ (4) and calculating the corresponding series $R1_0$ by solving the equation $R1_0=[F1_0]^{-1}.U^{mean}(\omega)/D^{mean}(\omega)$ in which $F1_0$ is the subs-matrix of F0 relating to the segmentation. This segmentation of the index 0 is preferably determined so that $F1_0$ is a numerically invertable matrix, for example, by the method described at page 926 of the above-mentioned article by P. Grivelet.

Then, using an iterative method, a new estimate $R1_{p+1}$, $R0_{p+1}$ is found at iteration p on the basis of the segmentation $F1_p$, $F0_p$ (11):

for which the value of the function $H(R_{p+1})$ is less than the value of $H(R_p)$;

which has the same proportion of non-zero and zero coefficients (21 and 235 respectively), i.e. which corresponds to a new vertex of the polyhedron; and which differs from the preceeding solution in that one of the coefficients of $R1_p$ becomes zero, while one of the coefficients of $R0_p$ becomes non-zero.

To this end, the value of $H(R1_p)$ and its gradient $\nabla H(R1_p)$ are calculated (12) for each of the base values of $R1_p$. Simultaneously, the matrix G is calculated (13) as the product of the inverted matrix $[F1_p]^{-1}$ multiplied by the matrix $F0_p$.

AT (14) the product $G \cdot \nabla H(R1_p)$ is performed thus vector g having 235 coordinates, indicative of the variation of $H(R_p)$ with respect to these 235 coordinates.

The vector g is then subjected at (15) to a test to establish whether it is zero on non-zero. If all of the 235 coordinates in g are zero, then the absolute minimum of the function H(R) has been reached, i.e. the looked-for solution $R^o$ has been found (16). Otherwise, the largest coordinate $g_j$ of the 235 co-ordinates in g is selected (17) since this very probably represents the direction of the largest slope in the function H(R) and, consequently, is very likely to be the direction to be followed in order to minimize the function H(R) as quickly as possible.

The direction $d_j$ of the slope $g_j$ is a vector of dimension 21, calculated at (18) as follows:

$$d_j = G.g_j = \{d_{j(i)}, i=1 \text{ to } 21\}$$

By following this direction, the distance $\lambda$ to be followed along this slope in order to reach another vertex of the polyhedron is then determined (19). In other words, one of the base variables is to be zeroed in order to turn it into an out-of-base variable, and conversely one of the out-of-base variables is to be transformed into a non-zero base variable. To do this, there are 21 possible values of $\lambda\{\lambda_i, i=1 \text{ to } 21\}$ (24) suitable for zeroing the corresponding non-zero reflection coefficient $r1_{1(i)}$, with $\lambda_i$ being given by the equation:

$$\lambda_i = r1_{1(i)}/d_{j(i)}$$

For each of the 21 values of $\lambda_i$ obtained in this way, a new series $R1_{p+1}^i$ is obtained (20) using the formula:

$$R1_{p+1}^i = R1_p - \lambda_i d_j$$

For each of the 21 series $R1_{p+1}^i$ thus obtained, the corresponding value of $H(R1_{p+1}^i)$ is calculated (21).

Of the 21 values of $H(R1_{p+1}^i)$, only the smallest is retained (22), i.e. the value which reduces the value of the function H(R) as quickly as possible, and it is renamed $H(R1_{p+1})$ where:

$$H(R1_{p+1}) = \text{the minimum of } \{H(R1_{p+1}^i), i=1,21\}$$

A test at (23) determines whether $H(R1_{p+1})$ is smaller than $H(R1_p)$ obtained on the preceding cycle. If the test is positive, the new segmentation $R1_{p+1}$ is adopted for a new cycle putting $p=p+1$ (26), and the process returns to block (11). Otherwise, the coordinate $g_j$ of g is zeroed (25), and the method returns to the test at (15) in order to verify whether all of the coordinates in the vector g are zero.

It will easily be seen in the present example that the successive solutions $R_p$, including the initial solution $R^o$, always includes 21 non-zero coefficients and 235 zero coefficients.

VARIANTS OF THE INVERSION METHOD (FIG. 3A)

Attention is now directed to variants of the inversion method which additionally make it possible during the first step to inject information coming from one or more borehole logs and/or coming from surface seismic testing during the second step.

In a first variant, the choice of the initial solution $R^o = \{r^o_i\}$ can be guided by using information contained in one or more logs, for example a resistivity log, a density log, etc... The probability is high that a large variation of amplitude observed in one or more logs corresponds to an interface, i.e. to a variation in acoustic impedance. It is thus highly desirable for the acoustic impedance profile derived from inverting the VSP to be in agreement with information contained in logs relating to the locations of the interfaces.

In a second variant, it is desirable for the final solution $R = \{r_i\}$ to agree with the information available from surface seismic studies, in particular the stacking velocities Wa obtained during surface seismic line processing, or with accurate information concerning one or more geological strata, in particular, the propagation velocity through one or more given strata.

A third variant includes simultaneously combining the first and second variants mentioned above.

Figure 3:
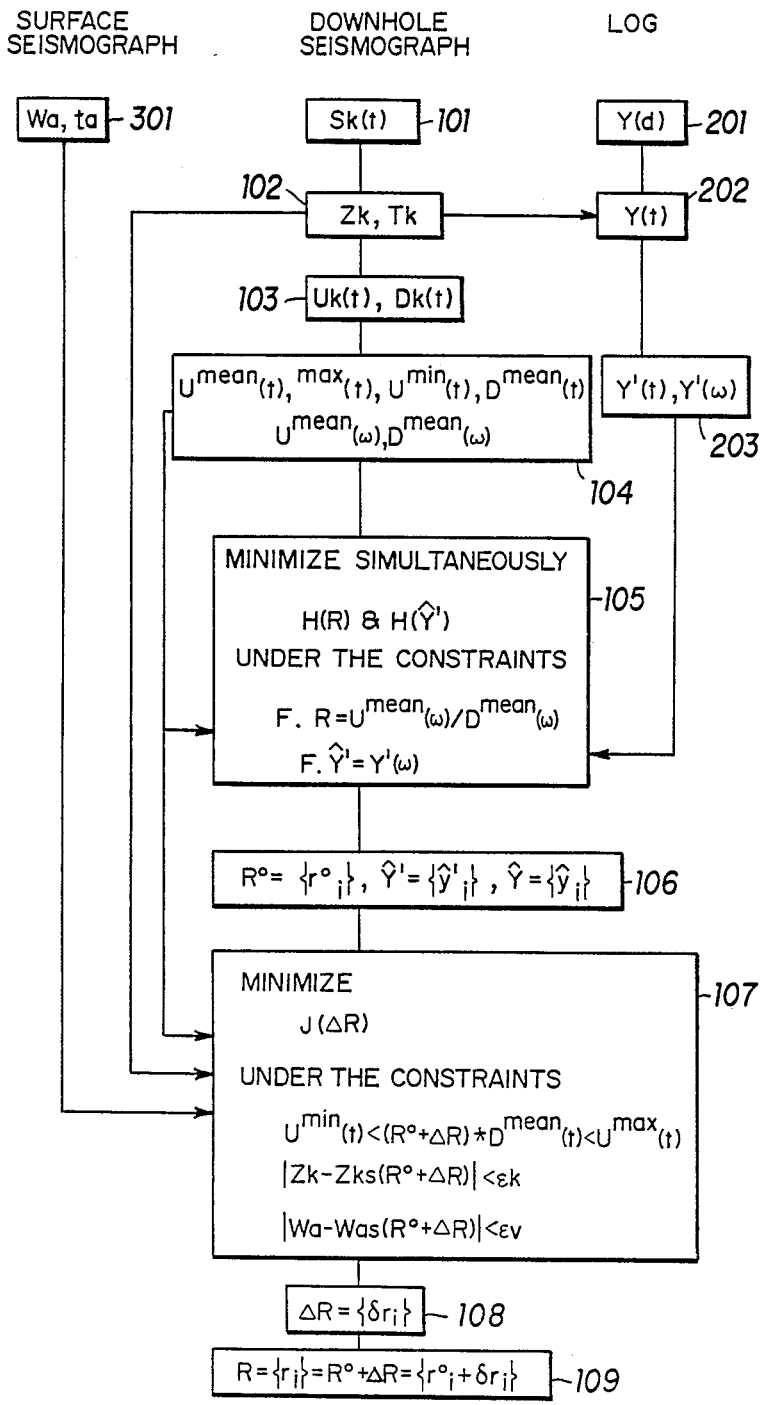
FIG. 3 is a general flowchart of a variant of the method in accordance with the present invention which comprises identifying the successive geological strata through which a borehole passes not only from the downhole seismic traces $S_k(t)$, but also from information derived from surface seismic traces and/or at least one borehole log.

Reference is now made to FIG. 3, illustrating a flowchart of the third variant, given that the first and second variants are easily deduced therefrom by omitting information coming from surface seismic processing or from logging, as the case may be.

For reasons of simplicity and conciseness of description, only one log Y(d) is used. However the inversion method can equally well accept a plurality of logs using an identical processing sequence in parallel with the sequence described for the log Y(d).

The available data includes:

the stacking velocities Wa corresponding to the surface seismic times ta (301);

the seismic traces Sk(t) of the VSP (101); and a log Y(d) expressed (201) as a function of borehole depth.

The following values are determined, in the manner as described with reference to FIG. 1 from the traces Sk(t) of the VSP (101):

the time-depth curve $\{Zk, Tk\}$ (102);

the upgoing wavefield Uk(t) and the downgoing wavefield Dk(t) which contain only primary waves (103); and the values $U^{mean}(t)$, $U^{mean}(\omega)$, $D^{mean}(t)$, $D^{mean}(\omega)$, $U^{max}(t)$ and $U^{min}(t)$ (104).

Using the time-depth curve $\{Zk, Tk\}$ the depth log $Y(d)$ is transformed into a time log $Y(t)=\{y_i(t)\}$ (202) expressed as a function of a time scale and sampled at the same interval as the sampling interval used for $Sk(t)$, i.e. as an interval of 1 ms in the present example, by a conventional change of scale method. FIG. 6D shows the time log $Y(t)$ obtained in this way. The discrete differential $Y'(t)=\{y'_i(t)\}$ of the log $Y(t)$ is then calculated (203) as follows:

$$Y'(t)=\{y'_i(t)=y_{i+1}(t)-y_i(t)\}$$

together with its transform $Y'(\omega)$ in the frequency domain.

There is an infinite number of possibilities for the number of interfaces and their locations. As mentioned above, a particular and preferable solution is the solution having an entropy minimum. In addition, it is desirable for the locations of the interfaces to correspond with the transitions that can be observed on a zoned log through relatively uniform geological strata.

The zoned log is written $\hat{Y}=\{\hat{y}_i\}$ and its discrete differential is written $\hat{Y}'=\{\hat{y}'_i\}$. Applying the entropy theory approach I developed, the zoning of a log may be expressed in the mathematical form, minimizing an entropy type function increasing in absolute value and symmetrical on the X-axis, and concave in the broad sense:

$$H(\hat{Y}) = \Sigma f(\hat{y}_i)$$

and, more particularly, the following function:

$$H(\hat{Y}) = \sum_{i=1}^{n} (1 - e^{-|\hat{y}_i|})$$

under the linear constraints $$F.\hat{Y} = Y(\omega)$$

It should be observed that this new approach to the problem of zoning is applicable, in a general manner, to any curve zoning operation, independently of VSP inversion.

In VSP inversion, this approach gives rise to an additional intermediate result constituted by the zoned log.

In VSP inversion, and by virtue of the limitation imposed by the usable frequency band [fmin, fmax], the zoning should reduce to a problem of m=21 possible interfaces for the example described. It will readily be understood that the series $\hat{Y}'$ should consequently comprise 21 non-zero values corresponding to 21 interfaces and 235 zero values corresponding to continuous zones.

The problem thus consists of finding two series $R^o = \{r^o_i\}$ and $\hat{Y}' = \{\hat{y}'_i\}$ which have the characteristic whereby the same indices correspond respectively to zero values and to non-zero values; and which simultaneously minimize the following two entropy type functions:

$$H(R) = \Sigma f(r_i) \text{ and}$$

$$H(\hat{Y}) = \Sigma e(\hat{y}'_i)$$

in which f and e are both functions which increase in absolute value, which are symmertrical on the X axis, and which are concave in the broad sense under the constraints $$F.R = U^{mean}(\omega)/D^{mean}(\omega) \text{ and}$$

$$E.\hat{Y} = Y(\omega)$$

in which F and E are the matrices associated with the Cooley-Tuckey fast Fourier transform "FFT" and are respectively restrained to a number which is identical to the selected frequencies. In the preferred embodiment, these two matrices should be restrained to an identical number of selected frequencies so that the two constraint equations define two respective polyhedra of the same family, i.e. whose vertices are defined by n coordinates of which are not more than m are non-zero, while the remaining n-m coordinates are zero.

In order to simplify the description, it will be assumed below that the functions f and e are identical and equal to the function f, and that the matrices F and E cover the same useful frequency band, i.e. the useful frequency band of the matrix F.

In this case, the following two functions therefore need to be minimized simultaneously (105):

$$H(R) = \Sigma f(r_i) \text{ and}$$

$$H(\hat{Y}) = \Sigma f(\hat{y}'_i)$$

whence, and preferably, the following two functions:

$$H(R) = \sum_{i=1}^{n} (1 - e^{-|r_i|}) \text{ and}$$

$$H(\hat{Y}) = \sum_{i=1}^{n} (1 - e^{-|\hat{y}'_i|})$$

under the following linear constraints $$F.R = U^{mean}(\omega)/D^{mean}(\omega) \text{ and}$$

$$F.\hat{Y} = Y(\omega)$$

The process (105) of simultaneously minimizing $H(R)$ and $H(\hat{Y}')$ is described in detail with reference to FIGS. 4A and 4B preferably using a modified reduced gradient algorithm, but may alternatively be performed using a modified projected gradient algorithm.

The results of this minimization (105) gives rise to an initial solution $R^o$ and to the discrete differential $\hat{Y}'$ (106). Integration of the discrete differential $\hat{Y}'$ obtained in this way, followed by shifting by an appropriate constant, makes it possible to reconstitute the zoned log $\hat{Y}$, shown in graphical form in FIG. 6D. This clearly shows up the different geological strata.

In the second step (107) and as already described with reference to FIG. 1, it is necessary to minimize the same linear function $J(\Delta R)$, as follows:

$$J(\Delta R) = \sum_{i=1}^{n} a_i |\delta r_i| \text{ with } \Delta R = \{\delta r_i\}$$

subjected to the same constraints as explained above, namely:

$$U^{min}(t) < [(R^o + \Delta R)*D^{mean}(t)] < U^{max}(t) \text{ and}$$

$$|Zk - Zks(R^o + \Delta R)| < \epsilon k$$

In addition, the minimizing of $J(\Delta R)$ can also be subjected to one or more additional constraints which are linear and which are taken, either from the stacking velocities obtained by surface seismic processing, or from the constraints related to prior knowledge of the propagation velocity through one or more given geological strata, or from both, simultaneously.

The stacking velocities corresponding to times $\tau a$ are designated by Wa. It is known that the stacking velocities are very close to the square roots of the second order moment of the series of internal velocities $V_i$. Consequently, in a manner similar to the constraint due to the time-depth curve, it is possible to assume that the difference between the real stacking velocities Wa and the synthetic stacking velocities Was calculated independently from the propagation speeds $V_i$ must be less than a magnitude $\epsilon v$ which is deduced from the uncertainty on Wa. This constraint can thus take the form of the following inequality:

$$\left| Na \cdot Wa^2 - \sum_{i=1}^{Na} V_i^2 \right| < \epsilon v$$

in which Na repesents time $\tau a$ expressed as a number of samples at the sampling interval duration $\Delta t$, i.e. 1 'ms in the present example, and $V_i$ is the wave propagation velocity in the interval [i, i+1].

Repeating the mathematical reasoning used above for linearizing the constraints related to the time-depth curve {Zk, Tk}, the constraint related to the stacking velocities can be summarized by the following inequality which is linear in $\delta r_i$:

$$\Delta t \sum_{i=1}^{Na} V_i^2 + 4 \cdot \Delta t \sum_{i=1}^{Na-1} \delta r_i \left( \sum_{j=i+1}^{Na} V_j^{o2} \right) = Was^2 (R^o + \Delta R)$$

or $Wa - Was (R^o + \Delta R) < \epsilon v$ in which $V^o_j$ is the propagation velocity as calculated from the coefficient $r^o_1$ as obtained during the first step from the equation:

$$V^o_j = V_1 \prod_{l=1}^{j-1} \frac{1 + r^o_l}{1 - r^o_l}$$

To sum up, the variant of the second step thus consists in minimizing the function:

$$J(\Delta R) = \sum_{i=1}^{n} a_i |\delta r_i| \text{ with } \Delta R = \{\delta r_i\}$$

under the following constraints which are linear in $\Delta R$:

$U^{min}(t) < [(R^o + \Delta R) * D^{mean}(t)] < U^{max}(t)$ and $|Zk - Zks(R^o + \Delta R)| < \epsilon k$ $Wa - Was(R^o + \Delta R) < \epsilon v$ In this variant, the process of minimizing the function $J(\Delta R)$ is also performed by means of a linear programming algorithm, such as the simplex algorithm as codified in the above-mentioned IMSL software.

Figure 6B:
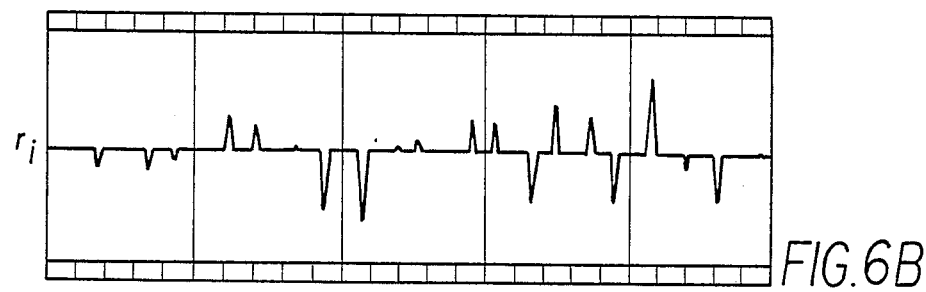
FIG. 6B illustrates the series of reflection coefficients $r_i$ obtained using the variant described with reference to FIG. 3.
Figure 6C:
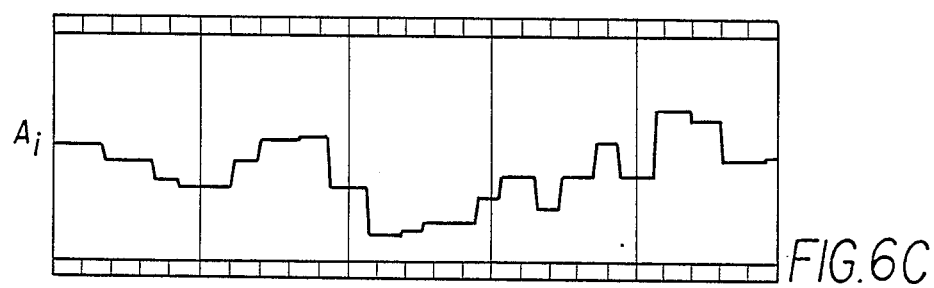
FIG. 6C illustrates the acoustic impedance profile obtained using the variant described with reference to FIG. 3.
Figure 6D:
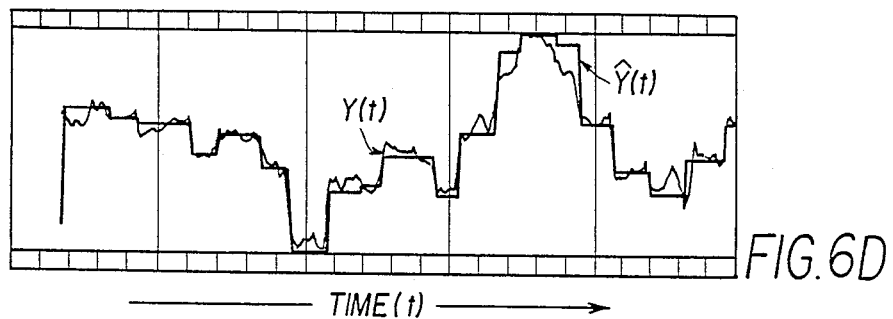
FIG. 6D illustrates the sampled borehole log Y(t) and the log Y(t) obtained after the zoning operation.

FIG. 6B shows a series of reflection coefficients $r_i$ obtained using the above-mentioned variant. It may be observed, in particular, that the positions of the reflection coefficients in FIG. 6B closely match the positions of the interfaces of the zoned log $\hat{Y}(t)$ shown in FIG. 6D.

Figure 4A:
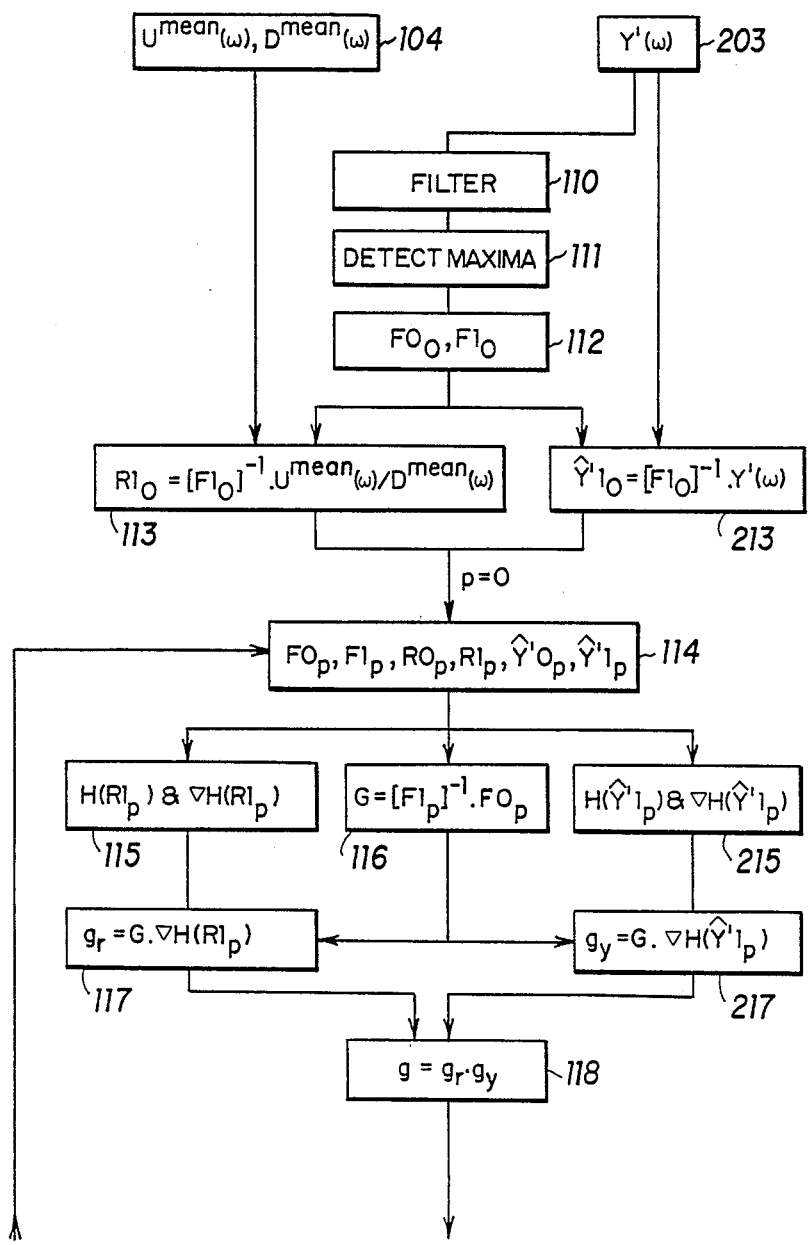
FIGS. 4A and 4B are a detailed flowchart of a particular method of minimizing the first step described with reference to FIG. 3.
Figure 4B:
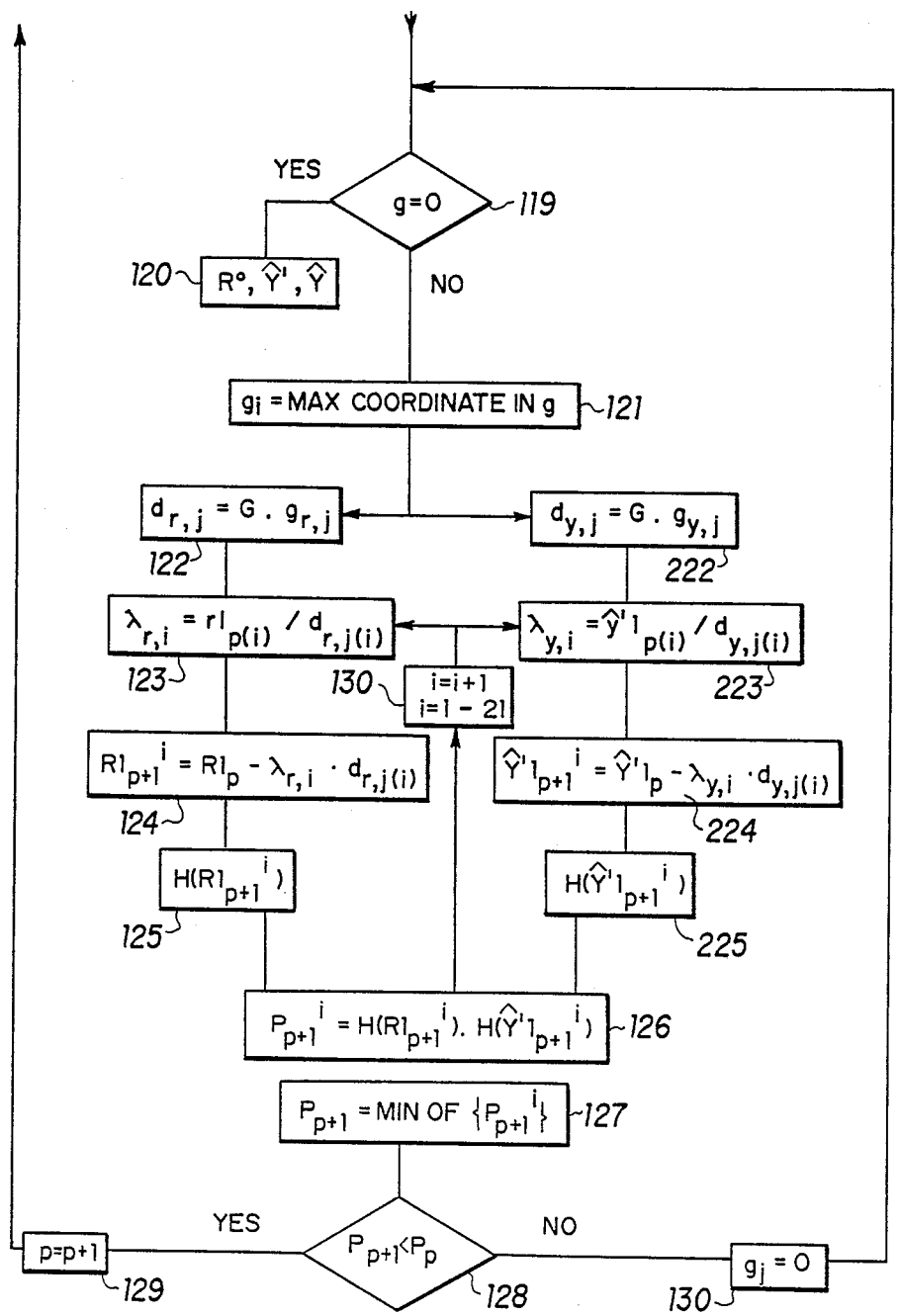

SIMULTANEOUSLY MINIMIZING H(R) AND H($\hat{Y}'$) (FIGS. 4A AND 4B)

Attention is now directed to FIGS. 4A and 4B, wherein the process for simultaneously minimizing the functions H(R) and H($\hat{Y}'$) which corresponds to a variant of the first step is illustrated.

By analogy with the description made with reference to FIG. 3, the equations of the constraints may be represented as two polyhedra, with the vertices of each of these polyhedra being defined by 256 coordinates. Thus, the process of simultaneous minimization consists in running successively through the vertices of the two polyhedra $R^{256}$ and $\hat{Y}'^{256}$ in order to obtain the low entropy series $R^o$ and $\hat{Y}'$.

The prior processing described with reference to FIG. 3 gives rise to mean upgoing and downgoing waves $U^{mean}(\omega)$ and $D^{mean}(\omega)$ (104), together with the discrete differential $Y'(\omega)$ (203). The maxima of the differential $Y'(\omega)$ are then determined (110, 111) in order to guide locating the interfaces and to obtain an initial segmentation of the index p=0 of the matrix F into two sub-matrices $F0_0$, $F1_0$ (112).

From this initial segmentation, the series: $R1_0 = [F1_0]^{-1} \cdot U^{mean}(\omega)/D^{mean}(\omega)$ and $\hat{Y}'1_0 = [F1_0]^{-1} \cdot Y'(\omega)$ are calculated simultaneously (113 and 213) with each of them corresponding to a vertex of the corresponding polyhedron and each serving as a starting point for an interative process similar to that described with reference to FIG. 2.

In the interative process, two new series $\{R1_p, R0_p\}$ and $\{\hat{Y}'1_p, \hat{Y}'0_p\}$ are found (114) at iteration p corresponding to the segmentation $F1_p$, $F0_p$, on the basis of the preceding segmentation $F1_{p-1}$, $F0_{p-1}$, such that the two new series preferably:

simultaneously reduce the values of the functions H(R) and H($\hat{Y}'$);

each comprise a number of zero coefficients and non-zero coefficients identical to the corresponding numbers of the series of index p−1;

there is a strict correspondence between the indices of the zero coefficients and the non-zero coefficients; and each zero one coefficient in each of the two series and with the same index, while enabling another zero coefficient in each of the two series and likewise having the same index in both cases to become non-zero.

To this end, the value of the function $H(R1_p)$ and its gradient $\nabla H(R1_p)$ are calculated (115), as are the value of the function $H(\hat{Y}'1_p)$ and its gradient $\nabla H(\hat{Y}'1_p)$ (215). Simultaneously, the matrix G which is the product of the inverted matrix $[F1_p]^{-1}$ multiplied by the matrix $F0_p$ is also calculated (116).

By obtaining the products $G \cdot \nabla H(R1_p)$ (117) and $G \cdot \nabla H(\hat{Y}'1_p)$ (217), two vectors $g_r$ and $g_y$ are respectively obtained each comprising 235 values respectively indicative of the variation for each of their 235 coordinates of the corresponding function H.

A vector g is calculated (118) whose 235 coordinates are equal to the product of respective coordinates of $g_r$ and $g_y$. Then the vector g is subjected to a test (119) to detemine whether it is zero. If all of the 235 coordinates of g are zero, the looked-for solutions $R^o$ and $\hat{Y}'$ are found (120). Otherwise, the coordinate $g_j$ in the vector g having the maximum absolute value is selected (121).

Then, by analogy with the process described with reference to FIG. 2, the following are evaluated in succession:

the directions $$d_{r,j} = G \cdot g_{r,j} \text{ (122) and } d_{y,j} = G \cdot g_{y,j} \text{ (222)}$$

each of which directions is represented by a vector of 21 co-ordinates;

for each of the values of index i (130) the following distances are calculated:

$$\lambda_{r,i} = r1_{p(i)}/d_{r,j(i)} \text{ (123) and}$$

$$\lambda_{y,i} = y'1_{p(i)}/d_{y,j(i)} \text{ (223)}$$

which are to be followed along the respective directions $d_{r,j(i)}$ and $d_{y,j(i)}$ in order to reach the following vertex of the corresponding polyhedron;

for each of the values of index i (130), the following series are calculated:

$$R1_{p+1}^i = R1_p - \lambda_{r,i} \cdot d_{r,j(i)} \text{ (124) and}$$

$$\hat{Y}1_{p+1}^i = \hat{Y}1_p - \lambda_{y,i} \cdot d_{y,j(i)} \text{ (224)}$$

for each of the values of index i (130) the values of the following functions are calcuated $$H(R1_{p+1}^i) \text{ (125) and}$$

$$H(\hat{Y}_{p+1}^i) \text{ (225)}$$

for each of the values of index i (130) the value $P_{p+1}^i$ (126) produced by multiplying together the functions $H(R1_{p+1}^i)$ and $H(\hat{Y}'_{p+1}^i)$, i.e.

$$P_{p+1}^i = H(R1_{p+1}^i) \cdot H(\hat{Y}_{p+1}^i)$$

Of the 21 values of $P_{p+1}^i$, only the smallest value is retained (127) and is renamed $P_{p+1}$, i.e.

$$P_{p+1} = \text{minimum of } \{P_{p+1}^i\} \text{ for } i=1 \text{ to } 21$$

A test (128) then serves to verify whether the inequality $P_{p+1} < P_p$ is true.

If the test (128) is true, the new segmentation $R1_{p+1}$ is adopted for a new cycle with $p = p+1$ (129) and the process returns to block (114). If the test (128) is false, the coordinate $g_j$ is reset to zero (130), and the process returns to the test at (119).

Rather than verifying that the value of the product of the two functions $H(R)$ and $H(\hat{Y}')$ is less than its value at the preceding iteration, an alternative to the above test (128) consists in verifying, more restrictively, that the value of each of these two functions for common index i is simultaneously less than its value at the preceding iteration.

As mentioned above, the description of the variants relates solely to the case for which the functions f and e are identical and equal to function f, and for which the matrices F and E cover the same useful frequency band, namely that of the matrix F. However, it is perfectly possible to minimize the entropies defined by two distinct function f and e both of which are increasing, are symmetrical on the X axis, and are concave. It is also possible to keep the matrices F and E as distinct matrices providing that the same number of frequencies is selected for both of them.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A method of identifying underground geological strata from a plurality of seismic traces $S_k(t)$ recorded in a borehole at different levels k of depth $Z_k$, wherein each trace $S_k(t)$ includes n discrete sample values sampled as a function of time t at a constant time interval $\Delta t$, the method determining the series $R = \{r_i, \text{ for } i = 1,n\}$ representative of seismic reflection coefficients at the interfaces formed between successive geological strata, wherein i is an index relating to the sampling depth on a time scale at the constant interval $\Delta t$, said method including the steps of:

establishing the time-depth curve relating the depth $Z_k$ to the transit time $T_k$ recorded on the trace $S_k(t)$ for each level k;

extracting the upgoing wavefield $U_k(t)$ and the downgoing wavefield $D_k(t)$ from the traces $S_k(t)$; and calculating $U^{mean}(t)$, $U^{min}(t)$, and $U^{max}(t)$ representative of mean value, minimum value, and maximum value, respectively, of the upgoing wavefield $U_k(t - T_k)$, and calculating $D^{mean}(t)$, representative of mean value of the downgoing wavefield $D_k(t + T_k)$;

said method further including the steps of:

(a) determining a series $R^o = \{r^o_i\}$, representative of an approximation to the series R, by minimizing the function $$H(R) = \Sigma f(r_i)$$

wherein $f(r_i)$ is an increasing function of $|r_i|$, which is symmetrical on the X axis, concave, and satisfies the constraint $$R * D^{mean}(t) = U^{mean}(t)$$

wherein the operator * represents a convolution product;

(b) determining a series $\Delta R = \{\delta r_i\}$ representative of a value for correcting the series $R^o$, and minimizing a function $J(\Delta R)$ which is linear in $|\delta r_i|$ under the constraints:

$$U^{min}(t) < [(R^o + \Delta R) * D^{mean}(t)] < U^{max}(t) \text{ and}$$

$$|Z_k - Z_{ks}(R^o + \Delta R)| < \epsilon_k$$

wherein $Z_{ks}(R^o + \Delta R)$ is a linearized function in $\Delta R$ representative of the depth $Z_{ks}$ calculated synthetically at level k from the initial solution $R^o$ and the magnitude $\epsilon_k$ is representative of the uncertainty in the magnitudes of $Z_k$ and $T_k$; and (c) calculating the series $R = R^o + \Delta R \{R_i = r^o_i + \delta r_i\}$ representative of seismic reflection coefficients.

2. The method according to claim 1, said method further including the step of transposing the values of $U^{mean}(t)$ and $D^{mean}(t)$ into the frequency domain thereby obtaining the values $U^{mean}(\omega)$ and $D^{mean}(\omega)$.

3. The method according to claim 2, said method further including the step of calculating $F.R = U^{mean}(\omega)/D^{mean}(\omega)$, wherein F is a matrix indicative of a Fast Fourier Transform having a predetermined frequency band.

4. The method according to claim 1, wherein the function $J(\Delta R)$ is of the form $$J(\Delta_R) = \Sigma a_i |\delta r_i|$$

wherein $a_i$ is a weighting coefficient dependent on $r_i$.

5. The method according to claim 4, said method further including the steps of:

transposing at least one predetermined logging curve Y(d) into a discrete log $Y(t) = (y_i(t))$ sampled on a time scale at the time interval $\Delta t$, said at least one predetermined logging curve being a function of depth d of the borehole over a depth interval including the depth levels Zk;

calculating discrete differential of Y(t) and its transform in the frequency domain, obtaining $Y'(\omega)$; and said step of determining a series $R^o = \{R^o_i\}$ further includes the step of determining the series $\hat{Y}' = \{\hat{y}'_i\}$ representative of the discrete differential of the zoned log $\hat{Y}(t)$ for which the zero values of $r^o_i$ and $\hat{y}'_i$ have the index i, by simultaneously minimizing the functions $$H(R) = \Sigma f(r_i) \text{ and}$$

$$H(\hat{Y}) = \Sigma e(\hat{y}'_i)$$

wherein $e(\hat{y}'_i)$ is an increasing function of $|\hat{y}'_i|$, symmetrical on the X axis and concave, under the constraints $$F.R = U^{mean}(\omega)/D^{mean}(\omega) \text{ and}$$

$$E.\hat{Y} = Y'(\omega)$$

wherein E is a matrix indicative of a Fast Fourier Transform having a predetermined frequency band.

6. The method according to claim 4, said method further including the step of minimizing the function $J(\Delta R)$ according to the constraint $$|Wa - Was(R^o + \Delta R)| < \epsilon v$$

wherein Wa are stacking velocities corresponding to times $\tau a$, $Was(R^o + \Delta r)$ is a linearized function in $\Delta R$, representative of the synthetic stacking velocity Was computed from the initial solution $R^o$, and the magnitude $\epsilon v$ is representative of the uncertainty on the stacking velocities Wa.

7. The method according to claim 5 wherein the function f is defined as:

$$f(r_i) = (1 - e^{-|r_i|})$$

8. The method according to claim 5 wherein the matrices E and F have identical predetermined frequency bands.

9. The method according to claim 4, wherein the weighting coefficient $a_i$ is equal to the larger of $1/r^{omin}$ or $1/r^o_i$, wherein the value $r^{omin}$ is the minimum value of the non-zero coefficients $r^o_i$.

10. A method of identifying underground geological strata by performing a zoning operation on a discrete log $Y(t) = \{y_i(t), i = 1, n\}$ sampled at a constant time interval $\Delta t$, thereby obtaining a series $\hat{Y}' = \{\hat{y}'_i, i = 1, n\}$ indicative of the positions of the interfaces formed between successive geological strata, said method including the steps of:

calculating discrete differential $Y' = \{y'_i\}$ of Y, and calculating its transform in the frequency domain thereby obtaining $Y'(\omega)$;

determining the series $\hat{Y}'$, indicative of the positions of the interfaces, by minimizing the function:

$$H(\hat{Y}) = \Sigma e(\hat{y}'_i)$$

wherein $e(\hat{y}'_i)$ is an increasing function of $|\hat{y}'_i|$ symmetrical on the X axis and concave, under the constraint $$E.\hat{Y} = Y'(\omega)$$

wherein E is a matrix indicative of the Fast Fourier Transform having a predetermined frequency band.

11. The method according to claim 10, wherein the function e is defined as:

$$e(\hat{y}'_i) = (1 - e^{-|\hat{y}'_i|})$$

* * * * *